No. 856,494. PATENTED JUNE 11, 1907.
E. C. SHAW.
PNEUMATIC TIRE CLIP.
APPLICATION FILED JAN. 6, 1906.
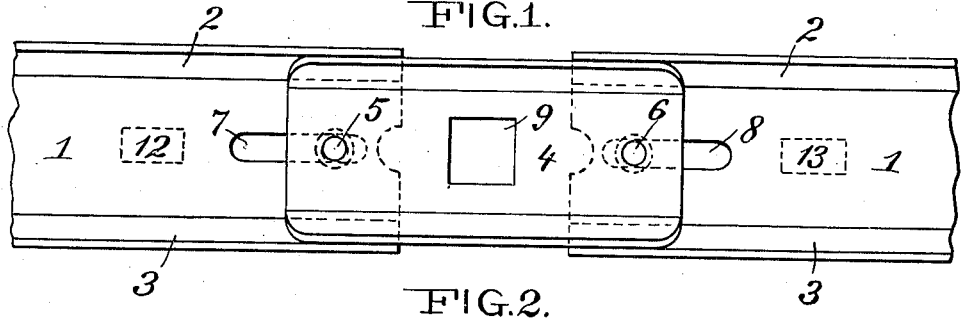
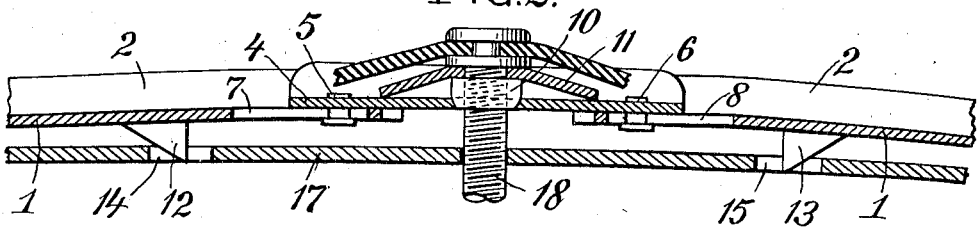
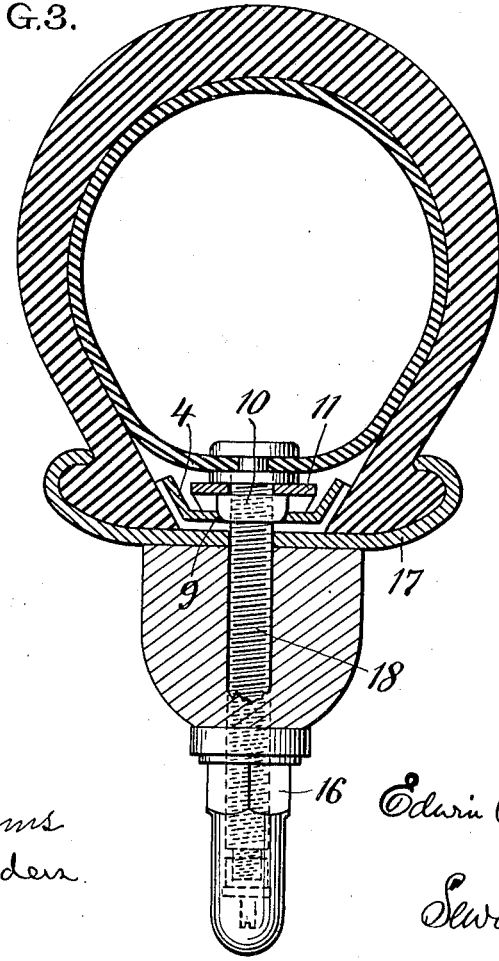
WITNESSES:
Oliver Williams
Harry G. Sanders
INVENTOR
Edwin Copland Shaw
BY
Seward Davis
ATTORNEY

UNITED STATES PATENT OFFICE.

EDWIN COUPLAND SHAW, OF AKRON, OHIO, ASSIGNOR TO THE B. F. GOODRICH COMPANY, OF AKRON, OHIO, A CORPORATION OF OHIO.

PNEUMATIC-TIRE CLIP.

No. 856,494.     Specification of Letters Patent.     Patented June 11, 1907.

Application filed January 6, 1906. Serial No. 294,833.

*To all whom it may concern:*

Be it known that I, EDWIN COUPLAND SHAW, a citizen of the United States, residing in the city of Akron, county of Summit, and State of Ohio, have invented certain new and useful Improvements in Pneumatic-Tire Clips, of which the following is a specification.

My invention relates to that class of retaining devices for pneumatic tires usually termed clips.

As shown in the drawings, the peculiarity of the clincher tire resides in the form of that part of the tire-casing which adjoins and is secured to the wheel rim. The edges of the tire-casing terminate in beads formed thereon, which are shaped to be grasped and held by outwardly, upwardly and inwardly curved flanges extending along the edges of the wheel rim. The beads and flanges are so shaped that any pressure from within the casing tends to seat the beads more firmly in the clinches, the inflation of the tire in the case of pneumatic tires performing this function to a certain extent. This pressure, however, is not sufficient to insure the attachment of the tire to the rim particularly in the event of severe lateral strains, nor to prevent "creeping" or movement of the tire circumferentially about the rim. Moreover, should the tire become deflated, even this degree of security is lost and the tire easily becomes detached. In the present state of the art certain devices are in use adapted to increase the security of this attachment. These devices, which are termed clips, are provided inside the tire-casing at various points along its length. This clip comprises a shaft or bolt adapted to pass through the rim and felly, and is provided with a nut or cap, usually threaded, by means of which the shaft can be pulled downward. The upper extremity of the clip terminates in a device which consists of a comparatively flat central portion and two upwardly extending flanges at its opposite sides which are inclined outward. These flanges are spaced and shaped to fit against the similarly inclined portions of the inner surface of the tire-casing, and will, when pulled downward, act as a wedge between the toes of the tire beads, force the said beads firmly into the clenches, and secure them therein, irrespective of the air pressure inside the inner tube. With the usual automobile tire from four to six of these clips are used, and the labor of adjusting them and of adjusting the tire casing and inner tube with relation thereto is considerable.

The object of my invention is to provide a single structure which shall act as a clip about the entire periphery of the wheel, and which can be applied by a single operation. I accomplish these objects by means of the structure hereinafter described and claimed, reference being had to the drawings which form a part thereof.

Figure 1 is a plan view of a section of this continuous clip, showing the means for attaching the ends and the sliding joint, which permits the clip to be loosened or tightened at will. Fig. 2 is a longitudinal-section of the clip and the channel-iron, and of a tire valve which I prefer to use as means for tightening the clip. Fig. 3 is a cross-section of a clencher tire and rim applied to a wheel felly showing the location of the clip with respect to the tire-casing, and the means for forcing the clip down into place.

Throughout the drawings like reference numerals refer to like parts.

In Fig. 1, 1 is the base plate of the continuous clip, and comprises an annular band or strip, preferably of metal, which is adapted to extend about substantially the entire periphery of the wheel. The edges of this band are provided with upwardly extending flanges 2 and 3, which are inclined outwardly and shaped to seat against the toes of the tire beads. The formation of this band and of the flanges at its edges is such that when the band is drawn tightly about the rim it will act as a wedge between the inclined inner surfaces of the tire-casing and force the beads firmly into the clenches. To permit the clip to be contracted or distended, I provide it with some form of sliding or telescoping joint, which will permit the ends of the band to be drawn together or forced apart at will. I have shown in the drawings, Figs. 1 and 2, an operative form of such a joint, although other methods of uniting the clip ends will readily suggest themselves. I provide a binding plate 4 which has a general form similar to that of the main band, having a base plate and edge flanges, although its width is slightly less than that of the main band to permit the former to slide within the latter. Near the ends of this plate I provide downwardly extending screws or rivets 5 and 6, which are solidly attached to the binding plate and which extend downwardly through elongated slots 7 and 8 in the adjoining ends of the clip. The lower ends of these screws or rivets are provided with nuts or are headed to retain the shafts within the slots, while the connection is sufficiently loose to permit longitudinal movement of the rivets in the slots, and consequently longitudinal movement of the band ends relatively to the binding plate. These rivets may be made removable or may be permanently inserted in position. The resulting structure, then, is a continuous annular band or clip extending entirely about the rim, and which is capable of expansion and contraction. At the center of the binding plate I provide a slot 9 shaped to admit the valve-stem or some suitable form of bolt. Upon this valve-stem or bolt there must be a head of too great diameter to pass through the slot 9, and I prefer to provide a nut 10 having beveled and flattened sides, which will permit this nut to seat within the slot, and if the nut is made integral with the bridge washer 11 the valve stem is held from rotation.

Upon the under side of the band near its terminals I provide means for causing the terminals to approach each other when the band or the binding plate is forced downward toward the rim. I have shown one embodiment of the compression means which consists of the triangular lugs 12 and 13, one upon the under side of the band near each terminal, and the slots 14 and 15 cut in the rim and suitably located to co-operate with the lugs. The inclined faces of these lugs are placed posteriorly with relation to the binding plate and are adapted to contact with the edges of the slots so that any pressure exerted downwardly upon this part of the band or upon the binding plate will draw the band terminals toward each other, tighten the clip and thus force its flanges against the toes of the tire bead.

The operation of my device is as follows: The clip is distended sufficiently to allow it to be slipped over one clench and placed about the channel-iron between the clenches, the hole 9 registering with the hole in the channel-iron and felly designed to receive the valve or the bolt which may be used in its place. The tire is then applied, its beads being seated within the clenches and the valve-stem thrust through the binding plate, channel-iron and felly. The tire is inflated and the downward pressure thus exerted upon the clip causes the inclined faces of the lugs 12 and 13 to contact with the slot edges and thus compresses the band against the tire casing, forcing the beads firmly into the clenches. The cap 16 or any suitable form of nut which may be substituted therefor is then attached to the valve stem and tightened, pulling the stem downward and locking the clip in place, so that its flanges wedge between the toes of the tire beads. The band may be tightened in this manner, but owing to the danger of causing the binding plate to buckle it is advisable to first inflate the tire and thus force the clip down into position, partially at least, before applying the cap.

By varying the proportion of the band, binding plate, slots and triangular lugs, the degree of expansion and contraction of which the clip is capable can be varied to adapt the structure to the form of the rim intended to be used. The proportions must be such however that the band can be expanded sufficiently to slip over the rim flange, and contracted enough to seat tightly between the casing edges. My device is particularly adapted for use with wheel rims having a removable flange in which case the degree of expansion and contraction needed is very slight.

Having described my invention what I claim is:

1. A clip for pneumatic tire casings comprising an annular split band adapted to be contracted circumferentially by the inflation of said casing and means for effecting such contraction integral with said band, adapted to co-act with means integral with the tire seating channel.

2. A retaining clip for pneumatic tire casings comprising an annular compression band and contracting means integral with said band adapted to co-act with means integral with the wheel rim and to be actuated by inflation of the tire.

3. A clip for pneumatic tire casings comprising a flexible annular band and means for engagement between the band and the rim for contracting the said band when downward pressure is exerted upon it.

4. A retaining clip for tire casings comprising an annular compression band and co-acting means integral respectively with the band and the wheel rim for contracting the band when the tire is inflated, and means for securing the band in the contracted position.

5. A clip for a tire casing comprising an annular compression band having upwardly and outwardly inclined edges adapted to lie between the casing edges and, when the band is contracted, to force said edges against the flanges upon the rim; and co-acting means upon the rim and band for contracting said band when downward pressure is applied.

6. In combination with a tire casing, a retaining clip comprising an annular compression band having its edges formed to seat against the inner surface of the tire casing, co-acting contracting means upon the band and rim respectively, and integral therewith, adapted to draw said band downwardly between the tire casing walls, and means for securing the said band in the contracted position.

7. A clip for clencher tire casings comprising an annular band, a binding plate slidably connected to the terminals of said band, and means formed upon said band for causing its terminals to approach each other when the binding plate is forced downward, substantially as described.

8. A retaining band for tire casings comprising a flexible annular plate adapted to lie between the casing edges, upwardly and outwardly projecting flanges upon the edges of said plate adapted to contact with the inner surfaces of the casing edges, a binding plate slidably connected to the terminals of said plate, wedges extending downwardly from said plate, slots in the wheel rim adapted to engage said wedges and to force the plate terminals toward each other when the plate is forced downward, and means for forcing said plate downward toward the channel-iron, substantially as described.

9. A continuous clip for tire casings comprising an annular compression band adapted to lie between the edges of a tire casing, outwardly and upwardly projecting flanges upon the edges of the said band adapted to contact with the inner surfaces of the casing walls, a binding plate slidably connected to the terminals of said band, a valve-stem passing through said binding plate and provided with a nut seating against the upper surface of said plate, and a threaded cap adapted to draw said stem and said binding plate downward.

10. A continuous clip for pneumatic tire casings comprising the flexible band 1, the flanges 2 and 3 upon its edges, the binding plate 4 slidably connected to the terminals of said band, the triangular wedges 12 and 13 extending downwardly from said band, the slots 14 and 15 in the channel-iron adapted to receive said wedges, the valve-stem 18 carrying the nut 10 adapted to seat within the slot 9 in said binding plate, and the cap 16 adapted to engage the extremity of the valve-stem and to draw said stem and said binding plate downward.

EDWIN COUPLAND SHAW.

Witnesses:
C. C. GOODRICH,
W. K. MEANS.